F. DE FAZI.
GAS ENGINE PISTON.
APPLICATION FILED NOV. 10, 1911.

1,021,577.

Patented Mar. 26, 1912.

WITNESSES:
Julia Ricci
Wallis L. Luther

INVENTOR:
Fulvio De Fazi
by Chas. N. Luther
ATTORNEY.

UNITED STATES PATENT OFFICE.

FULVIO DE FAZI, OF PROVIDENCE, RHODE ISLAND, ASSIGNOR OF ONE-HALF TO WILLIAM DOUGLASS BLOSSFIELD, OF PROVIDENCE, RHODE ISLAND.

GAS-ENGINE PISTON.

1,021,577.  Specification of Letters Patent.  Patented Mar. 26, 1912.

Application filed November 10, 1911. Serial No. 659,588.

*To all whom it may concern:*

Be it known that I, FULVIO DE FAZI, a subject of Italy, residing at Providence, in the county of Providence and State of Rhode Island, have invented a new and useful Improvement in Gas-Engine Pistons, of which the following is a specification.

This invention has reference to an improvement in gas engines and more particularly to an improvement in gas engine pistons.

In the usual construction of gas engine pistons having a ball and socket joint for the connecting rod, the whole socket is secured to the inside of the piston head, in an inconvenient position for assembling or removal of the parts, also there is no adequate provision for taking up wear in the joint, or for oiling the joint.

The object of my invention is to improve the construction of a gas engine piston having a ball and socket joint for the connecting rod, whereby the socket is permanently secured to the piston head, through an opening in the same, the connecting rod having a ball end is inserted through the piston head and socket, a thrust block is adjustably secured in the socket and held against a retrograde movement, and means are provided for oiling the ball and socket joint.

My invention consists in the peculiar and novel construction of a gas engine piston and ball and socket joint for the connecting rod, said piston and ball joint having details of construction, as will be more fully set forth hereinafter and claimed.

Figure 1:
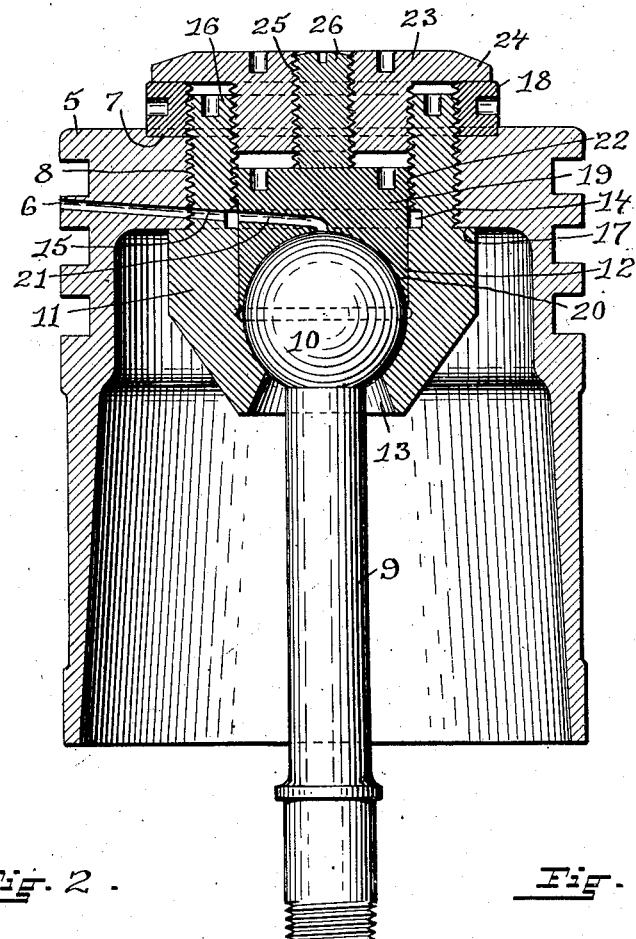
Figure 2:
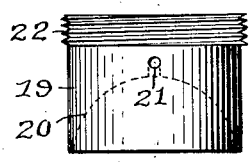
Figure 3:
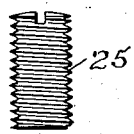

Figure 1. is a longitudinal sectional view through a gas engine piston, provided with my improved ball and socket joint for the connecting rod. Fig. 2. is a side view of the thrust block with right screw-threads, and Fig. 3. is a side view of the set-screw with left screw-threads.

In the drawings, 5 indicates a gas engine piston having a transverse radial oil duct 6, a circular concentric depression 7 in the head which may be of any required depth and a central circular screw-threaded hole 8 in the head, 9 a connecting rod having a ball end 10 which with the socket 11 forms the ball and socket joint for the connecting rod. The socket 11 has a cylindrical chamber 12 internally screw-threaded at its upper end and shaped at its lower end to fit the ball end 10 of the connecting rod 9, an outwardly flaring opening 13 from the chamber, for the connecting rod, an internal annular oil groove 14, a transverse radial oil duct 15 on a line with the oil duct 6, and extending into the oil groove 14, and a reduced externally screw-threaded upper end 16 forming an annular shoulder 17, the socket being secured in the screw-threaded hole 8 by screwing the upper end 16, through the hole 8, and by a screw-threaded ring 18 which screws on to the projecting end of the socket against the bottom of the depression 7, thereby rigidly securing the socket to the piston head, as shown in Fig. 1. A cylindrical thrust block 19 having a semi-spherical cavity 20 in its end, for the ball end of the connecting rod, a radial oil duct 21 and an externally right screw-threaded end 22, is adjustably secured, for wear, in the socket 11 by screwing the same into the chamber 12. A screw-threaded cap 23 having an annular flange 24 and a central left screw-threaded hole 25 is secured by screwing the same into the chamber 12 and a left screw-threaded set screw 26 is screwed through the hole 24 in the cap 22 against the thrust block 19 as shown in Fig. 1.

By this construction all of the removable parts of the ball joint are easily accessible from the outside of the piston head without removing the piston from the engine; the thrust block is adjustable for wear from the outside and when adjusted is locked in the adjusted position thereby eliminating rattling and pounding of the joint, and the joint is adequately oiled.

Having thus described my invention I claim as new and desire to secure by Letters Patent:—

1. An engine piston having a hole in its head, a socket secured to the head of the piston through the hole, a connecting rod having a ball end in the socket, a thrust block in the socket engaging with the ball end on the connecting rod, means for adjusting the thrust block for wear, means for holding the thrust block in the adjusted position and means for oiling the socket.

2. An engine piston having a screw-threaded hole in its closed end, a screw-threaded socket in the screw-threaded hole in the piston end, a connecting rod having a ball end in the socket, a thrust block in the socket and fitted to the ball end of the connecting rod, means for adjusting the thrust block for wear, means for holding the thrust block in the adjusted position and means for oiling the socket.

3. An engine piston having a screw-threaded hole in its closed end, a socket screwed into the hole in the piston end, a connecting rod having a ball end in the socket, a thrust block in the socket and having a semi-spherical cavity for the ball end on the connecting rod, means for adjusting the thrust block for wear, means for holding the thrust block in the adjusted position and means for oiling the socket.

4. An engine piston having a screw-threaded hole in its closed end, a shouldered socket screwed into the hole in the piston end, and having a cylindrical chamber contracted at its inner end, a connecting rod having a ball end in the chamber, a thrust block in the chamber and having a semi-spherical cavity in its end for the ball end of the connecting rod, a cap in screw-thread engagement with the socket, a set screw in screw-thread engagement with the cap and bearing on the thrust block and means for oiling the socket.

5. An engine piston having a screw-threaded hole in its closed end and a radial oil duct extending into the hole, a shouldered socket having a portion in screw-thread engagement with the hole in the piston end and extending outward through the same, an internally screw-threaded chamber having a rounded inner end terminating in an outwardly flaring opening, an internal annular oil groove and a radial oil duct on a line with the oil duct in the piston and extending into the oil groove, a screw-threaded ring in screw-thread engagement with the outer end of the socket, and engaging with the piston end, a connecting rod having a ball end in the socket chamber, a thrust block in screw-thread engagement with the screw-threaded chamber and having a semi-spherical cavity in its end and an oil duct which extends from the cavity outward, means for adjusting the thrust block for wear, a cap in screw-thread engagement with the outer end of the socket and having a flange which engages with the ring on the socket and a set screw in screw-thread engagement with the cap and bearing on the thrust block.

In testimony whereof, I have signed my name to this specification in the presence of two subscribing witnesses.

FULVIO DE FAZI.

Witnesses:
C. PERRY WHITE,
CHAS. H. LUTHER.